United States Patent
Socci et al.

(10) Patent No.: US 10,766,562 B2
(45) Date of Patent: Sep. 8, 2020

(54) FORECARRIAGE OF A ROLLING MOTOR VEHICLE

(71) Applicant: PIAGGIO & C. S.P.A., Pontedera (IT)

(72) Inventors: Luciano Socci, Pontedera (IT); Andrea Raffaelli, Pontedera (IT)

(73) Assignee: PIAGGIO & C. S.P.A., Pontedera (PISA) (IT)

( * ) Notice: Subject to any disclaimer, the term of this patent is extended or adjusted under 35 U.S.C. 154(b) by 148 days.

(21) Appl. No.: 16/065,247

(22) PCT Filed: Dec. 28, 2016

(86) PCT No.: PCT/IB2016/058044
§ 371 (c)(1),
(2) Date: Jun. 22, 2018

(87) PCT Pub. No.: WO2017/115293
PCT Pub. Date: Jul. 6, 2017

(65) Prior Publication Data
US 2019/0367125 A1    Dec. 5, 2019

(30) Foreign Application Priority Data

Dec. 28, 2015  (IT) .......................... 102015000088101

(51) Int. Cl.
*B62K 25/08* (2006.01)
*B62D 9/02* (2006.01)
(Continued)

(52) U.S. Cl.
CPC ................ *B62K 25/08* (2013.01); *B62D 9/02* (2013.01); *B62K 5/01* (2013.01); *B62K 5/027* (2013.01);
(Continued)

(58) Field of Classification Search
CPC . B62D 9/02; B62K 5/01; B62K 5/027; B62K 5/10; B62K 2005/001; B62K 25/08
See application file for complete search history.

(56) References Cited

U.S. PATENT DOCUMENTS 2,029,735 A * 2/1936 Minott ..................... B62D 9/02
                                                    280/124.109
9,216,790 B2 * 12/2015 Takano ................ B60G 17/005
(Continued)

FOREIGN PATENT DOCUMENTS

CN         102862454 A    1/2013
CN         106256569 A    12/2016
(Continued)

OTHER PUBLICATIONS

International Search Report and Written Opinion for PCT/IB2016/058044, dated Apr. 18, 2017.
(Continued)

*Primary Examiner* — Faye M Fleming
(74) *Attorney, Agent, or Firm* — Cantor Colburn LLP

(57) ABSTRACT

A forecarriage (8) of a rolling motor vehicle (4), comprising a forecarriage frame (16), at least a pair of front wheels (10"), each wheel (10") being connected to a rolling kinematic mechanism (20), which enables the front wheels (10") to roll in a synchronous and specular manner, by means of a respective axle journal (60), and a roll block system (100) comprising a rod extensible in length (110) which directly connects one of the two front wheels (10") at the respective axle journal (60) to said forecarriage frame (16) by means of hinging means (71, 72, 73) at both its ends, and means (120) to reversibly block the lying position of said rod extensible in length (110) on a rolling plane with respect to said axle journal (60) and to said forecarriage frame (16), so as to block the rolling movements allowed by said rolling kinematic mechanism (20).

24 Claims, 6 Drawing Sheets

(51) Int. Cl.
  *B62K 5/01* (2013.01)
  *B62K 5/027* (2013.01)
  *B62K 5/10* (2013.01)
  *B62K 5/08* (2006.01)
  *B62L 3/02* (2006.01)
  *B62K 5/00* (2013.01)

(52) U.S. Cl.
  CPC ............ *B62K 5/08* (2013.01); *B62K 5/10* (2013.01); *B62L 3/02* (2013.01); *B62K 2005/001* (2013.01)

(56) References Cited

U.S. PATENT DOCUMENTS

| | | | | |
|---|---|---|---|---|
| 2013/0131923 A1* | 5/2013 | Tzipman | ................ | B62D 24/04 701/38 |
| 2013/0153311 A1 | 6/2013 | Huntzinger | | |
| 2018/0265157 A1* | 9/2018 | Hara | .................. | B62K 25/08 |
| 2019/0009630 A1* | 1/2019 | Raffaelli | .................. | B62K 5/08 |
| 2019/0344855 A1* | 11/2019 | Raffaelli | .................. | B62K 5/10 |
| 2019/0366792 A1* | 12/2019 | Raffaelli | ................ | B60G 21/05 |

FOREIGN PATENT DOCUMENTS

| | | |
|---|---|---|
| DE | 3433986 A1 | 3/1986 |
| EP | 2889210 A1 | 7/2015 |
| EP | 2899107 A1 | 7/2015 |
| EP | 2913255 A1 | 9/2015 |
| TW | 200815231 A | 4/2008 |
| TW | I410339 B | 10/2013 |

OTHER PUBLICATIONS

Chinese Office Action for corresponding application 2016800826822 filed Dec. 28, 2016; Report dated Jul. 27, 2019.

Taiwanese Office Action for corresponding application 105143307 filed Dec. 27, 2016; Report dated Jan. 10, 2020.

* cited by examiner

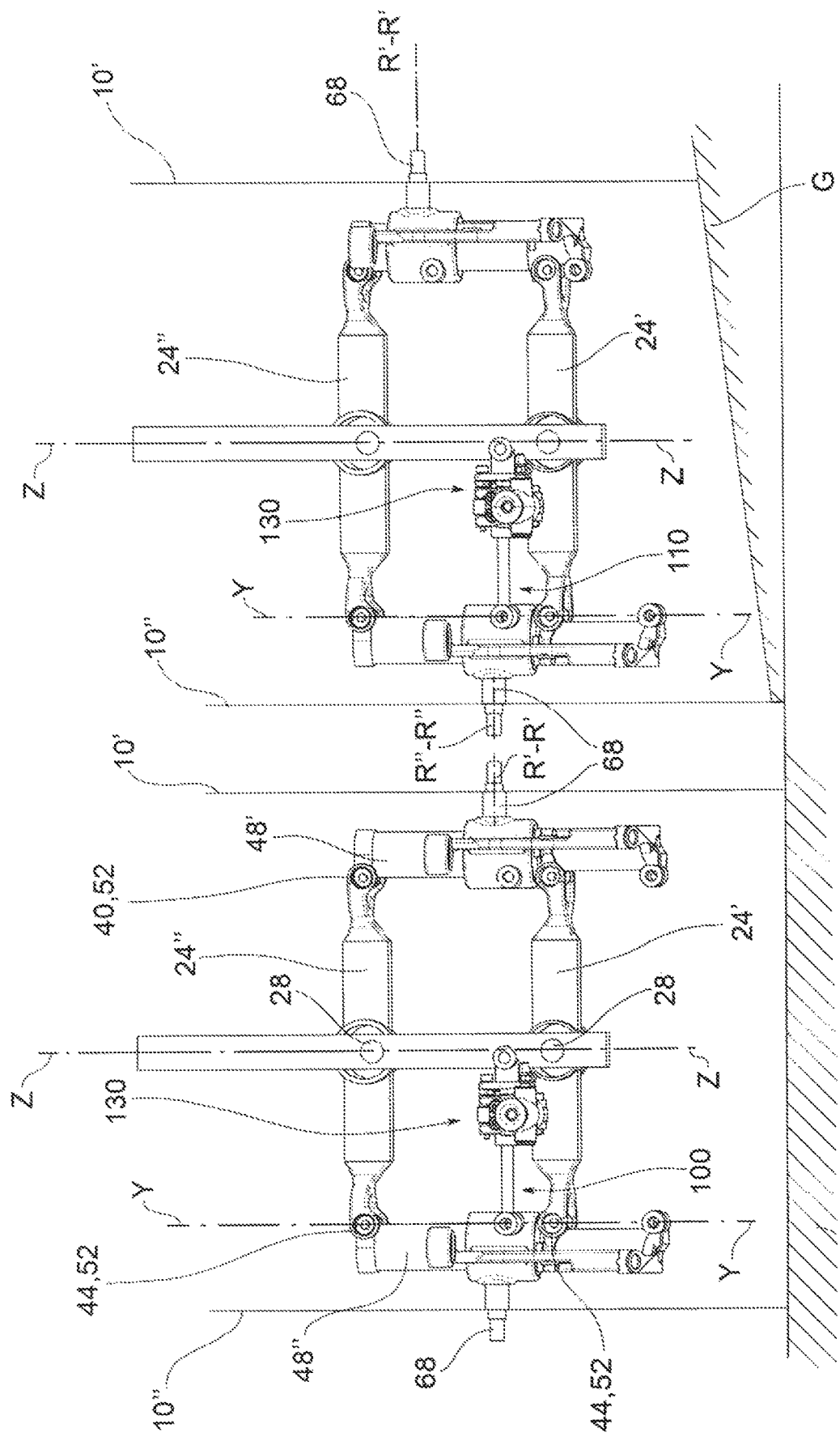

FORECARRIAGE OF A ROLLING MOTOR VEHICLE

CROSS-REFERENCE TO RELATED APPLICATION

This application is the 35 U.S.C. § 371 national stage application of PCT Application No. PCT/I B2016/058044, filed Dec. 28, 2016, where the PCT claims the priority to and benefit of Italian Patent Application No. 102015000088101, filed Dec. 28, 2015, both of which are herein incorporated by reference in their entireties.)

FIELD OF APPLICATION

The present invention relates to a forecarriage of a rolling motor vehicle with roll block.

In particular, the motor vehicle according to the invention may be a motor vehicle equipped with two steering and rolling wheels at the front and a fixed axle drive wheel at the rear.

STATE OF THE ART

In the field of motor vehicles there is a growing supply of "hybrid" vehicles, which combine the characteristics of motorcycles in terms of handling, with the stability of four-wheeled vehicles.

Such models are represented, for example, by three-wheeled motor vehicles equipped with two front steering wheels and four wheel motor vehicles known as QUADS.

More specifically, the aforementioned three-wheeled motor vehicles are provided with two steering and rolling wheels (i.e. tilting or inclining) at the front and a fixed axle drive wheel at the rear. The rear wheel is intended to provide torque and thus allow traction, while the front wheels, paired, are intended to provide the directionality of the vehicle. The paired wheels at the forecarriage can tilt and roll as well as steer. Thanks to this solution compared to three-wheeled motor vehicles with two wheels at the rear axle, motor vehicles with two wheels at the forecarriage are like an actual motorbike since, just like a motorbike, the vehicle is able to incline in a curve. Compared to a motor vehicle with only two-wheels, such vehicles with two paired wheels on the forecarriage have however a greater stability ensured by the double support on the ground of the front wheels, similar to that provided by a car.

The front wheels are kinematically connected to each other by means of kinematic mechanisms which enable the front wheels to roll synchronously and in a specular manner for example through the interposition of articulated quadrilaterals. Such vehicles are further provided with two independent suspensions, one for each of the two front wheels, equipped with shock absorbers which are also independent.

Rolling, three-wheeled motor vehicles are thus designed to provide the user with the handling of a two-wheel motorcycle and, at the same time, the stability and safety of a four-wheeled motor vehicle.

A rolling three-wheeled motor vehicle of this type is described for example in the Italian patent application no.IT2003MIA001108 on behalf of the same applicant.

Due to the structural peculiarities of this type of motor vehicle it is possible that under particular travel conditions, for example, at very low speeds or during breaks or stops the vehicle may fall over as a result of an accidental and/or uncontrolled rolling movement.

This problem has been addressed by equipping the aforesaid vehicles with roll block systems, operated by the user manually or by an automatic control system.

A roll block system for such motor vehicles is described for example in the Italian patent application no. IT2004A000171 on behalf of the same applicant. The roll block system is described in relation to a rolling motor vehicle equipped with a steering system with an articulated quadrilateral structure and two independent front suspensions. The roll block system comprises: a mechanical caliper suitable to block the movements of the articulated quadrilateral so as to prevent the rolling permitted by it; two hydraulic calipers operated simultaneously by an electric motor acting on rods placed in parallel with the shock absorbers so as to prevent the rolling caused by asymmetric spring suspension movements of the two wheels.

The disadvantage of the block system described above lies in its complexity. It needs in fact three separate blocking devices: one acting on the articulated quadrilateral; two on the shock absorbers.

Other anti-roll systems intended for rolling motor vehicles provided with a steering system with an articulated quadrilateral structure are described in the European patent application EP2810861A1, the French patent FR2953184 and the European patent EP2345576B1. Such anti-roll systems operate directly on the articulated quadrilateral structure and block the rolling by blocking the movement of the articulated quadrilateral.

All the anti-roll systems mentioned above, since specifically designed to operate on a steering system with an articulated quadrilateral structure, are directly bound to the presence of this structure and its mechanical configuration.

There is therefore a need to develop a rolling motor vehicle equipped with a roll block system which is mechanically simpler to produce and which can be applied regardless of the rolling kinematic mechanism present on the motor vehicle.

PRESENTATION OF THE INVENTION

The purpose of the present invention is therefore to eliminate or at least reduce, the problems mentioned above relative to the prior art, by providing a forecarriage of a rolling motor vehicle equipped with a roll block system which makes it possible to block the rolling movements not due to asymmetric spring suspension movements in a mechanically simpler way than the conventional solutions.

A further purpose of the present invention is to make available a forecarriage of a rolling motor vehicle equipped with a roll block system, which makes it possible to block all the rolling movements, including those related to asymmetric spring suspension movements which is mechanically simpler than the conventional solutions.

A further purpose of the present invention is to make available a forecarriage of a rolling motor vehicle equipped with a roll block system which is constructively simple and inexpensive to produce and fit to said motor vehicle.

DESCRIPTION OF THE DRAWINGS

The technical characteristics of the invention can be seen clearly from the contents of the following claims and the advantages of the same will be more clearly comprehensible from the detailed description below, made with reference to the appended drawings, showing one or more embodiments by way of non-limiting examples, wherein:

FIGS. 6a and 6b illustrate the effects of an asymmetrical spring suspension movement between the two front wheels of a motor vehicle according to the invention with articulated quadrilateral tilting system, by means of two schematised and simplified views of a roll block system according to the invention, respectively, without asymmetric spring suspension movements and with asymmetric spring suspension movements, the ground being indicated with the letter G.

DETAILED DESCRIPTION

Figure 1:
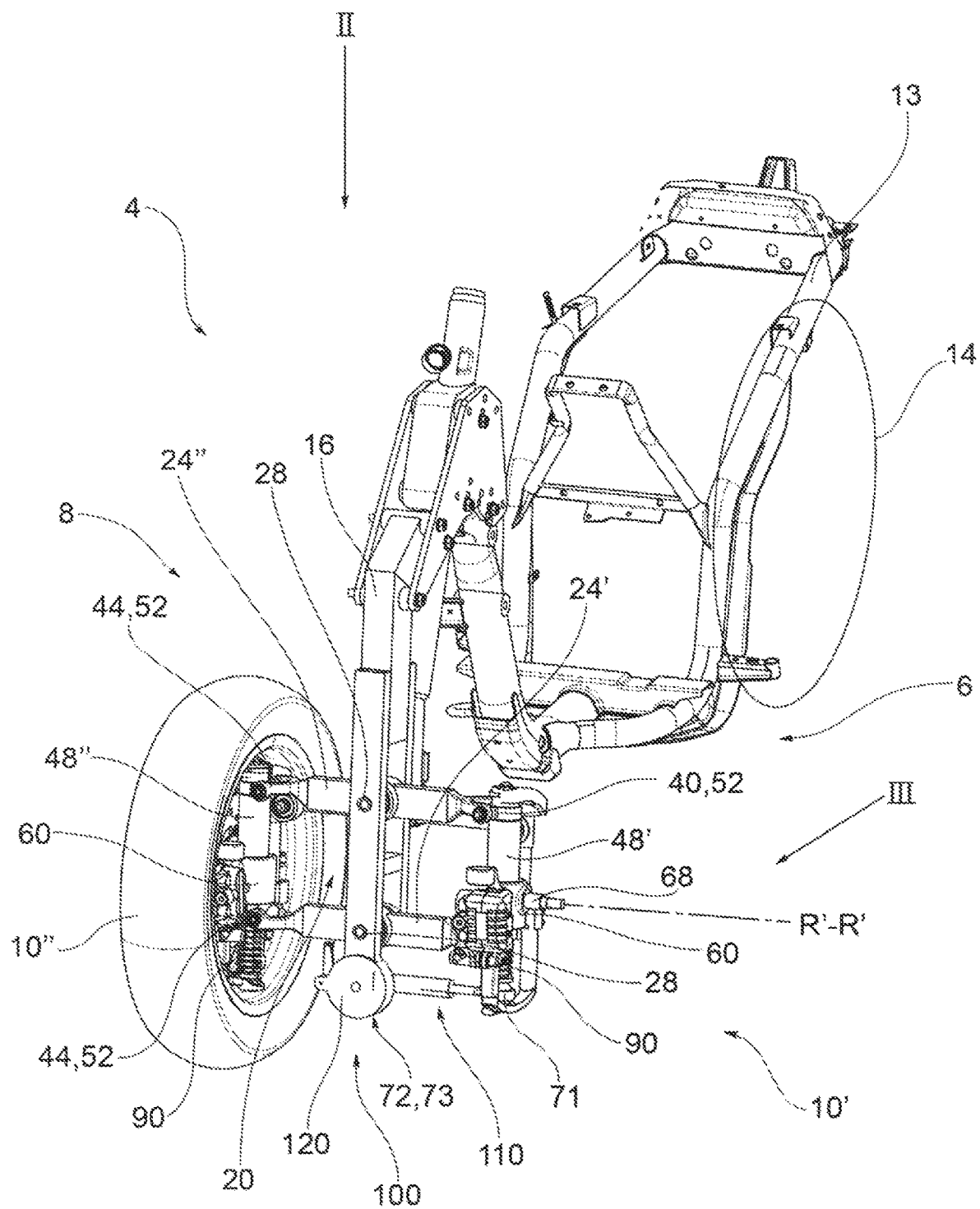
FIG. 1 shows a partial perspective view of a motor vehicle equipped with a forecarriage with an articulated quadrilateral tilting system and with a roll block system according to a first embodiment of the invention.
Figure 2:
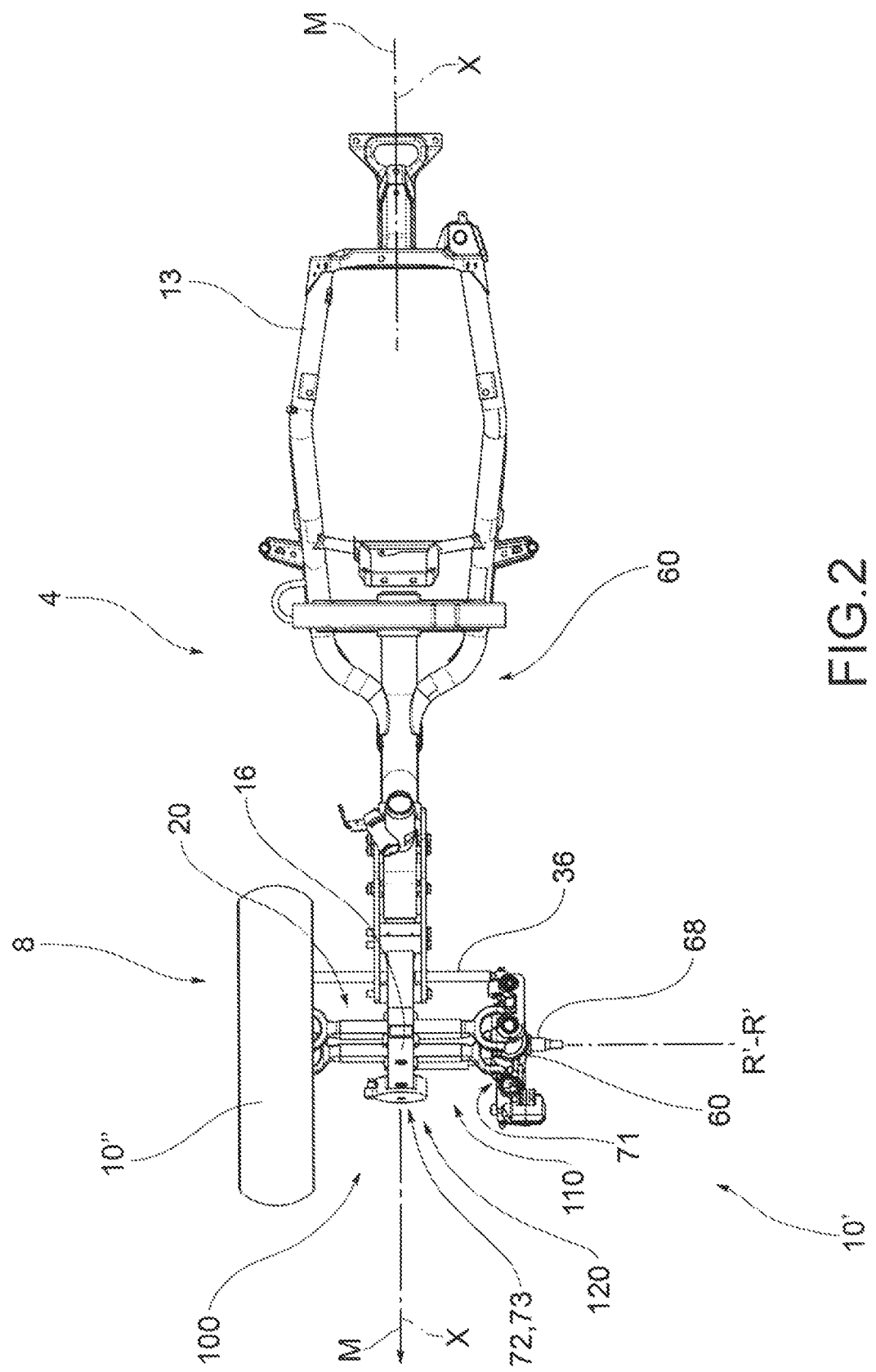
FIG. 2 shows an orthogonal plan view of the motor vehicle in FIG. 1 from the side of the arrow II in FIG. 1.
Figure 3:
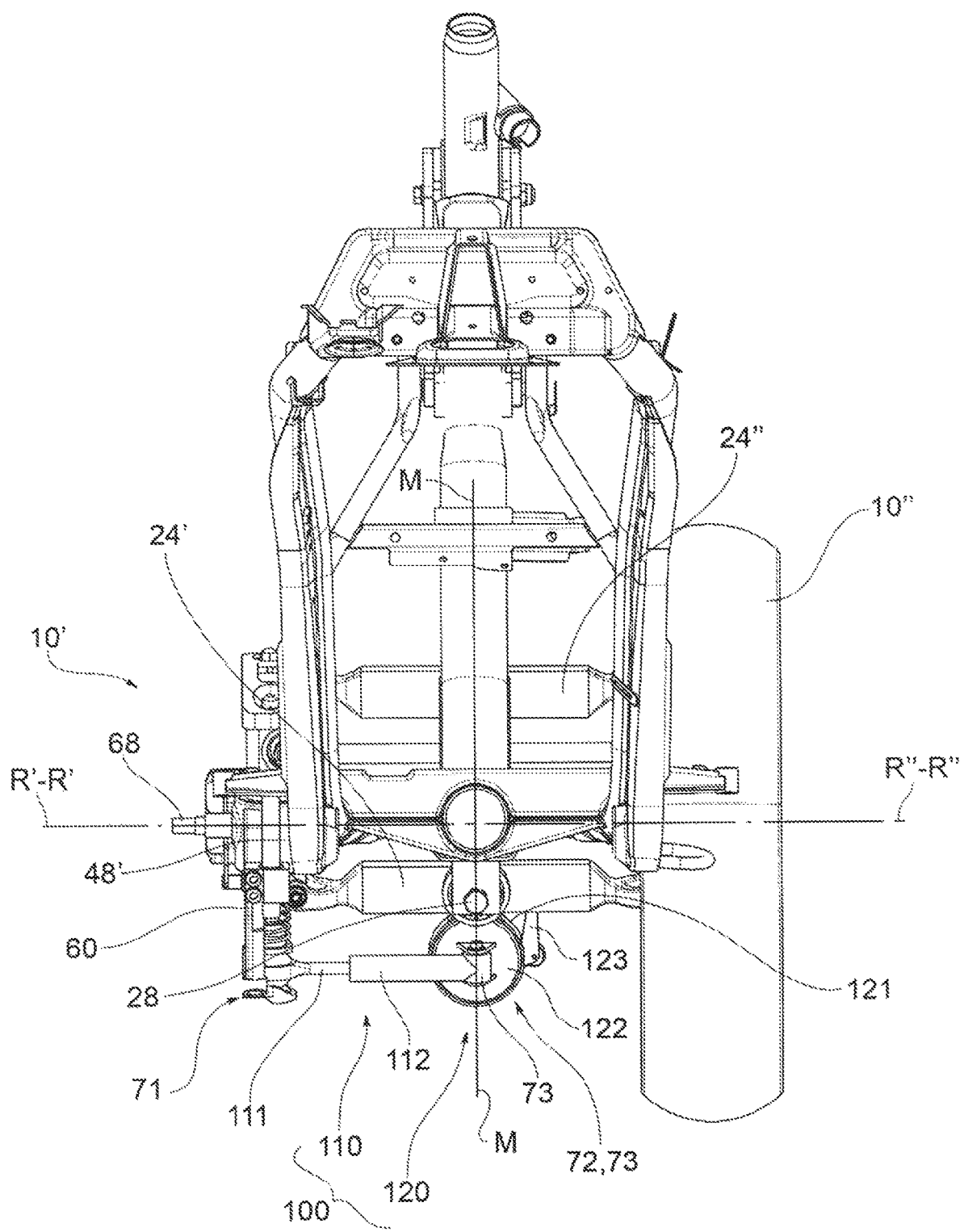
FIG. 3 shows a rear view of the motor vehicle in FIG. 1 from the side of the arrow III in FIG. 1.

With reference to the aforementioned figures, reference numeral 4 globally denotes a motor vehicle according to the present invention.

For the purposes of the present invention, it should be pointed out that the term motor vehicle should be considered in a broad sense, encompassing any motor cycle having at least three wheels, i.e. two aligned wheels, as described better below, and at least one rear wheel. Such definition therefore also comprises so-called quad bikes having two wheels on the forecarriage and two wheels on the rear axle.

The motor vehicle 4 comprises a frame 6 extending from a forecarriage 8, supporting at least two front wheels 10, to a rear 12 supporting one or more rear wheels 14. It is possible to distinguish a left front wheel 10' and a right front wheel 10" in which the definition of left and right 10', 10" is purely formal and means in relation to a driver of the vehicle. Said wheels are arranged to the left and right of the centreline plane M-M of the motor vehicle, compared to a point of observation of a driver driving it.

In the following description, and also in the drawings, reference will be made to symmetrical or specular elements of the forecarriage with respect to said centreline plane M-M using the quotes ' and ' to indicate respectively the components to the left and right of the forecarriage, compared to a point of observation of a driver driving it.

For the purposes of the present invention, the frame 6 of the motor vehicle may be any shape, size and may for example be of the lattice type, box type, cradle, single or double, and so forth. The frame 6 of the motor vehicle may be in one piece or in multiple parts; for example the frame 6 of the motor vehicle interconnects with a rear frame 13, which may comprise an oscillating rear fork (not shown) supporting one or more rear drive wheels 14. The aforesaid rear oscillating fork may be connected to the frame 6 by direct hinging or by the interposition of a lever mechanism and/or intermediate frames.

According to a general embodiment of the present invention, the motor vehicle forecarriage 8 comprises a forecarriage frame 16 and a pair of front wheels 10', 10" kinematically connected to each other and to the forecarriage frame 16 by means of a rolling kinematic mechanism 20 which enables the front wheels to roll in a synchronous and specular manner.

Thanks to said rolling kinematic mechanism, the aforesaid forecarriage frame 16 follows the axle journal in the rolling movements allowed by the rolling kinematic mechanism 20. The rolling movements allowed by the rolling kinematic mechanism 20 do not include the rolling movements deriving from asymmetric spring suspension movements of the axle journals and associated wheels.

As will be explained further on in the rest of the description, the rolling kinematic mechanism can have any configuration as long as it is functional to enable the front wheels to roll in a synchronous and specular manner. In particular, such rolling kinematic mechanism may be a system configured as an articulated parallelogram system (as shown in the embodiments of the appended drawings), or be a suspended longitudinal arms system.

Each wheel 10', 10" is connected to the aforesaid rolling kinematic mechanism 20 by means of a respective axle journal 60, which is mechanically connected to a rotation pin 68 of the wheel in order to support it rotatably around an axis of rotation R'-R', R"-R".

The "axle journal" of a wheel is understood to be the mechanical part of the motor vehicle designed to support the rotation pin of said wheel and to interconnect it kinematically to the suspensions, to the steering device and to the aforesaid rolling kinematic mechanism 20. The axle journal has no degrees of freedom with respect to the wheel pin and is therefore kinematically integral therewith. The axle journal may be made in one piece with the wheel pin or be mechanically constrained to it to form a single piece.

The forecarriage 8 of the motor vehicle further comprises:
a roll block system (100),
suspension means 90 which provide each axle journal 60 at least one spring suspension movement T-T with respect to the rolling kinematic mechanism 20.
a steering device 36 suitable to command the rotation of the axle journals 60 about respective steering axes S'-S', S"-S" of each front wheel 10', 10".

Preferably, as shown in the appended drawings, the aforesaid kinematic rolling mechanism 20 is an articulated quadrilateral system.

In more detail, such articulated quadrilateral system comprises a pair of cross members 24', 24", hinged to the forecarriage frame 16 at middle hinges 28. The cross members 24',24" are connected together, at opposite transversal ends 40,44 by means of uprights 48', 48" pivoted at said transversal ends 40,44 at side hinges 52. The cross members 24', 24" and the uprights 48', 48" define the aforesaid articulated quadrilateral 20.

Operatively, each of the uprights 48', 48" guides and supports an axle journal 60 of one of said front wheels 10', 10".

Advantageously, as provided for in the embodiments shown in the appended drawings, the articulated quadrilateral kinematic rolling mechanism 20 may be made in such a way that each of the uprights 48', 48" guides and supports the axle journal 60 of the respective front wheel 10', 10" coaxially to its main extension axis T-T. In such case, the suspension means 90 of each front wheel are integrated in the relative upright and provide the axle journal 60 a rectilinear spring suspension movement along the main extension axis T-T of the upright 48', 48".

More specifically, the axle journal 60 comprises a sleeve 88 placed coaxially to the upright 48', 48". Between the axle journal 60 and the upright 48', 48" are arranged suspension means 90 of the wheel 10. For example, the suspension means 90 comprise a spring and/or a damper.

In particular, the uprights 48', 48" are hollow so as to house internally, at least partially, the suspension means 90. Preferably, the suspension means 90 are arranged coaxially to the respective upright 48', 48".

Preferably, according to such embodiments, the coupling between each axle journal 60 and the respective upright 48', 48" is of the cylindrical type, so as to allow both translation and rotation of the axle journal 60 with respect to the main extension axis T-T of the upright 48', 48". Each front wheel 10', 10" has a steering axis S'-S', S"-S" which coincides with the main extension and symmetry axis T-T of the relative upright 48', 48".

In particular, each upright 48', 48' extends from an upper end 48s to a lower end 48i. The rotation pin 68 of each front wheel 10', 10" (integral with the axle journal 60) is placed between the upper end 48s and the lower end 48i of the corresponding upright 48', 48" of the articulated quadrilateral kinematic rolling mechanism 20.

Alternatively, according to embodiments not illustrated in the drawings, the articulated quadrilateral kinematic rolling mechanism 20 may be made in such a way that each of the uprights guides and supports the axle journal 60 of the respective front wheel 10', 10" externally to itself by means of a roto-translational type kinematic connection system.

More specifically, each axle journal 60 is supported by a support bracket which in turn is hinged to the aforementioned articulated quadrilateral 20 by means of steering hinges arranged in correspondence of the upper and lower ends of each upright. Said steering hinges define the respective steering axes S'-S', S"-S" of the wheels 10', 10", parallel to each other.

The axle journal 60 is hinged to the support bracket at opposite upper and lower axial ends, by means of at least three tilting hinges which define respective tilting axes and which realise a roto-translational connection between the axle journal 60 and the support bracket. In particular, the axle journal 60 is hinged to the support bracket via a connecting rod by means of two of said hinges.

The suspension means of each front wheel may, in particular, be integrated in the respective axle journal 60. More specifically, the axle journal 60 comprises a sheath inside which a spring is inserted, mechanically connected by means of a rod to the support bracket. The sheath is translatable with respect to the rod under the effect of the spring. Operatively, such system defines a spring suspension movement along a curvilinear trajectory.

According to an embodiment not illustrated in the appended figures, the aforesaid kinematic rolling mechanism 20 may be a system with two suspended arms.

More specifically, such a system may comprise, in particular, two suspended arms, hinged at their first ends to the forecarriage frame to rotate about a common axis of rotation, transverse to the centreline plane M-M of the motor vehicle. At its second ends, opposite the first, both said arms are suspended by suspension means, in turn supported by a rocker arm, hinged to the forecarriage frame. The rolling movement of the two front wheels 10' and 10" is permitted by the oscillation of the two suspended arms and the rocker arm. Each suspended arm supports at its second end an axle journal 60 of one of the two front wheels 10' and 10". In particular, each axle journal 60 is rotationally connected to the respective suspended arm to rotate about its own steering axis S'-S', S"-S". The steering device acts on two gripping portions integral with the axle journals.

According to a first aspect of the present invention, the aforesaid roll block system 100 comprises a rod extensible in length 110 which directly connects one of the two wheels 10', 10" at the respective axle journal 60 to the aforesaid forecarriage frame 16 by means of hinging means 71, 72, 73 at both its ends.

Functionally, thanks to said hinging means 71, 72 and 73 provided at both its ends, the aforesaid extensible rod 110 is suitable to passively follow the movements of the axle journal 60 and of the forecarriage frame 16 by varying its orientation in space with respect to them.

Preferably, the aforesaid hinging means, with which the extensible rod 110 is connected to the axle journal 60 and the forecarriage frame 16 at its two ends, consist of a ball joint 71 or of a device 72 and 73 kinematically equivalent to a ball joint 71. This way, the extensible rod 110 is able to second the movements of the axle journal 60 and of the forecarriage frame 16 without causing jamming or blocks.

In particular, the aforesaid device kinematically similar to a spherical joint may consist of a pair of cylindrical hinges 72 and 63 with axes orthogonal one to each other.

Preferably, a first hinge 72 of the pair has its own hinge axis orthogonal to the rolling plane of the two front wheels of 10', 10". Advantageously, thanks to this hinging solution the rod 110 can move parallel to the aforesaid rolling plane, when the reversible blocking means are not activated. This way it is also possible to separate the movement components, that one on the rolling plane and that one on a plane orthogonal to it. This choice is preferable in the particular case in which the rolling kinematic mechanism is composed of an articulated quadrilateral in which the uprights guide the movement of the axle journals according to a rectilinear motion (see appended drawings). The "rolling plane" is understood to mean a plane transverse to the longitudinal direction X-X or direction of travel of the motor vehicle, and thus incident to the centreline plane M-M of the motor vehicle.

Figure 4:
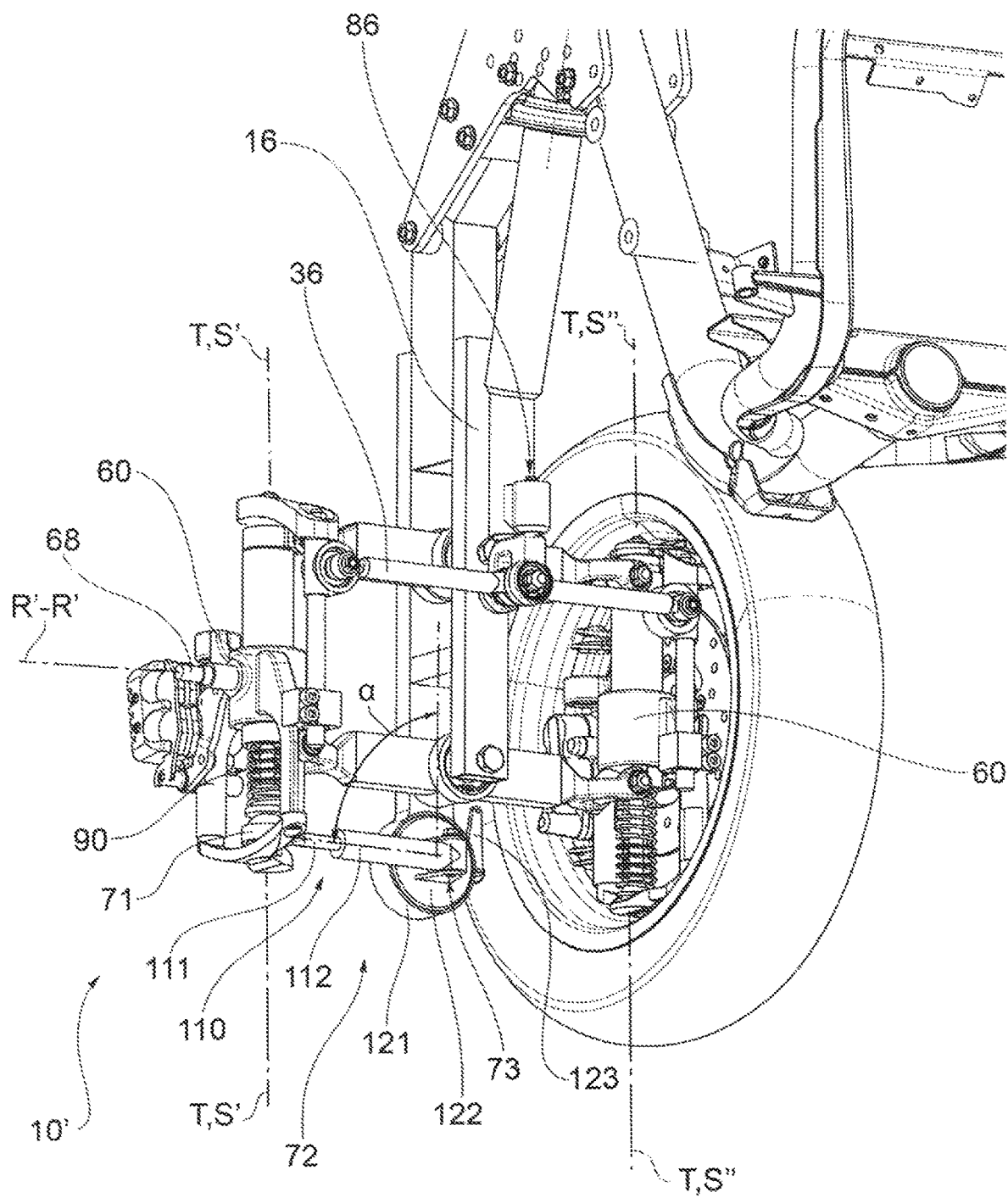
FIG. 4 shows a rear perspective view of the forecarriage of the motor vehicle in FIG. 1.
Figure 5:
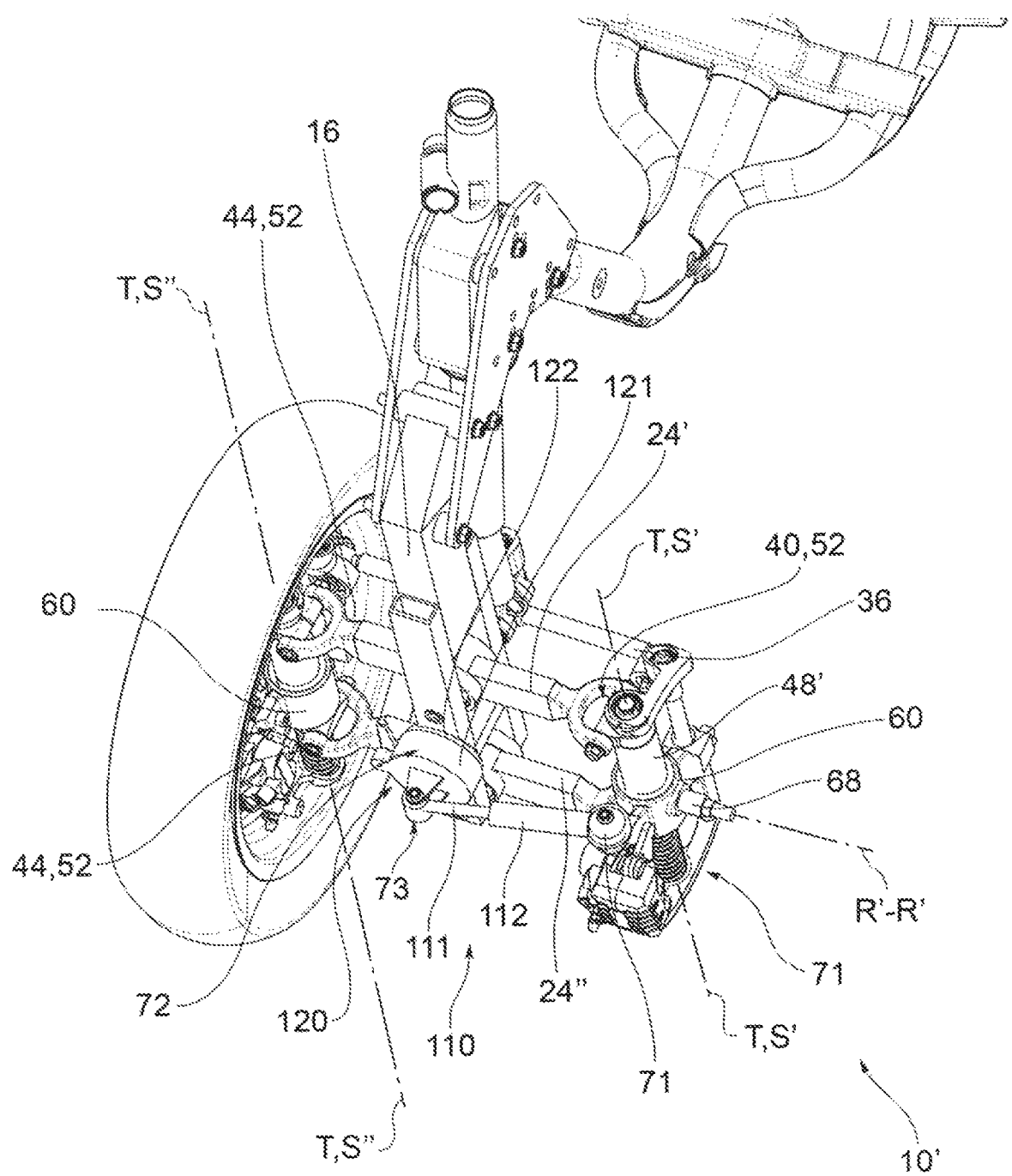
FIG. 5 shows a rear perspective view of the forecarriage of the motor vehicle in FIG. 1 equipped with a roll block system according to a second embodiment of the invention.

Advantageously, as shown in the FIGS. 4 and 5, it is possible that the rod 110 is connected at one end to a spherical joint 71 and at the other end to a pair of hinges 72, 73 with orthogonal axes, of which a first hinge with a hinge axis perpendicular to the rolling plane.

In the particular case in which the rolling kinematic mechanism does not allow a rectilinear spring suspension movement to the axle journals, it is preferable for the hinging means of the extensible rod 110 to consist of ball joints so as to prevent jamming in the movements of said rod 110.

Advantageously, the ball joints 71 or the pairs of hinges 72, 73 are connected to the axle journals 60 by means of support elements 63 integral with said axle journals.

Preferably, each rod extensible in length 110 is formed of at least two portions 111, 112 telescopically associated to one another according to a main direction of longitudinal extension. Preferably, such two portions 111, 112 of the rod 110 are associated to each other with a cylindrical coupling to allow a relative free rotation around said main direction of longitudinal extension.

According to a further aspect of the present invention, the roll block system 100 comprises reversible blocking means 120, 130 suitable to reversibly block the lying position of the extensible rod 110 on the rolling plane, with respect to the axle journal 60 and/or to the forecarriage frame 16, so as to be suitable to block the rolling movements allowed by the aforesaid rolling kinematic mechanism 20.

The "rolling plane" is understood to mean a plane transverse to the longitudinal direction X-X or direction of travel of the motor vehicle, and thus incident to the centreline plane M-M of the motor vehicle.

The lying position of the rod on the rolling plane is defined by the angle α formed by the projection of the rod 110 on a vertical projection plane, which is transverse to a centreline plane M-M, with a reference plane orthogonal to the axis of rotation R'-R', R"-R" of the wheel associated to said axle journal 60. More in detail, the angle α is defined between an intersection line—which is determined in turn between the projection plane and the reference plane—and the projection line of the rod.

Said vertical projection plane substantially corresponds to the rolling plane. Therefore, the vertical projection plane can be perfectly orthogonal to the centreline plane M-M (when the wheels are parallel to centreline plane) or can be inclined with respect to the centreline plane M-M (when the wheels are steering).

In other words, said reversible blocking means 120, 130 suitable to reversibly block the lying position of the extensible rod 110 on the rolling plane are able to selectively block the movements of the extensible rod 110 cinematically corresponding to rolling movements of the wheels 10', 10".

In other words again, said roll block system 100 comprises a length extensible rod 110 which directly connects one of said two front wheels 10' in correspondence of the respective axle journal 60 to said forecarriage frame 16 by means of hinging means 71, 72, 73 at both ends of said length extensible rod 110. Said length extensible rod 110 is adapted to passively follow the movements of said axle journal 60 and of said forecarriage frame 16 by varying its orientation in space with respect to the plane containing said axle journal 60 and the centreline plane M-M or a plane parallel to said centreline plane M-M. The block system 100 comprises reversibly blocking means 120, 130 suitable to reversibly block the spatial orientation of said length extensible rod 110 with respect to the plane containing said axle journal 60 and the centreline plane M-M or a plane parallel to said centreline plane M-M thereby exclusively blocking the rolling movements allowed by said kinematic rolling mechanism (20).

In this way, only rolling movements are blocked, while steering movements are not prevented. Preferably, the extensible rod 110 is connected to the forecarriage frame 16 in correspondence of said centreline plane M-M. However, the extensible rod 110 can be connected to the forecarriage frame 16 in correspondence of a plane parallel to the centreline plane M-M.

In the rest of the description and in the claims the expression "reversibly blocking means 120, 130 suitable to reversibly block the spatial orientation of said length extensible rod with respect to the plane containing the axle journal and the centreline plane M-M or a plane parallel to centreline plane M-M" and the expression "reversible blocking means 120, 130 suitable to reversibly block the lying position of the extensible rod 110 on the rolling plane, with respect to the axle journal 60 and/or to the forecarriage frame 16" have to be considered as equivalent and interchangeable expressions.

Operatively, the blocking of the lying position of the extensible rod 110 (or, in other words, the blocking of the spatial orientation of said length extensible rod 110 with respect to the plane containing said axle journal 60 and the centreline plane M-M or a plane parallel to centreline plane M-M) automatically determines the blocking of the relative position between the axle journal and the forecarriage frame, which is equivalent to the blocking of the rolling kinematic mechanism 20 and thus of the rolling movements allowed by it.

The blocking action on an axle journal is thus automatically transferred to the other axle journal too, at least as regards the rolling movements allowed by the kinematic rolling mechanism. The two axle journals and the two front wheels 10', 10" are in fact kinematically connected together by means of the kinematic rolling mechanism 20 to roll in a synchronous and specular manner.

As regards the spring suspension movements of the axle journals allowed by the respective suspensions the following may be noted.

Thanks to the fact that the rod 110 directly interconnects an axle journal 60 to the forecarriage frame 16, the blocking of the lying position of the extensible rod 110 (or, in other words, the blocking of the spatial orientation of said length extensible rod 110 with respect to the plane containing the journal and the centreline plane M-M or to a plane parallel to centreline plane M-M) automatically determines the blocking of the spring suspension movements of said axle journal to which the rod 110 is connected. Differently, the spring suspension movements of the other axle journal not affected by the interconnection with the rod 110 are, instead, still allowed, as can be seen by comparing FIG. 6a (which schematically illustrates the state of a roll block system in the absence of asymmetric spring suspension movements) and FIG. 6b (which illustrates the state with asymmetric spring suspension movements). It follows, therefore, that with respect to the traditional roll block devices, the roll block system according to the invention—at least in the general embodiment defined above—inhibits only partially the rolling movements due to an asymmetrical spring suspension movement of the front wheels. From FIGS. 6a and 6b it can, in fact, be observed that the articulated quadrilateral kinematic rolling mechanism represented therein does not change configuration passing from one situation to another.

In terms of performance, the roll block system according to the invention is equivalent, therefore, to a traditional roll block system with blocking of the articulated quadrilateral and blocking of a single shock absorber. This level of performance is obtained, however, in traditional systems with two blocks (one for the quadrilateral and one for the shock absorber), while in the roll block according to the invention, this level of performance is obtained with a single blocking element, i.e. the interconnection rod between an axle journal and the forecarriage frame. For the same performance the roll block system according to the invention is therefore, mechanically simpler than the traditional blocks.

Even with the same number of block components, the blocking system according to the invention performs better than conventional block systems.

To such purpose a comparison is proposed below between the block system according to the invention (with a single block) and a conventional system with blocking of the articulated quadrilateral only, i.e. without blocking of the shock absorbers. From an operative point of view, it can be stated that thanks to the blocking of the spring suspension movement of a single axle journal resulting from the present invention, the rigidity that the motor vehicle encounters in rolling is much greater than that which it would be encountered by a traditional motor vehicle with a roll block system, which inhibits only the movements of the rolling kinematic mechanism and does not intervene in blocking the suspensions and relative shock absorbers. In fact, if one tries to roll such a traditional motor vehicle in the aforesaid operating conditions (shock absorbers free and rolling kinematic mechanism blocked) by pushing it on its side, one sees the two suspensions in series and thus perceive a stiffness equal to half that of each spring. Differently, performing the same test on a motor vehicle with a roll block according to the invention, one sees only the stiffness of the free shock absorber. Thus, being the force exerted equal, the motor vehicle tilts by half.

The roll block offered by the present invention is therefore more effective than the conventional systems, in the case in which the latter do not include blocking of the shock absorbers or said block is deactivated.

Advantageously, according to an embodiment of the present invention, the roll block system 100 comprises two extensible rods, one for each axle journal 60, so as to interconnect both axle journals to the forecarriage frame. According to said particular embodiment, the block system according to the invention makes it possible to achieve a complete block of the rolling movements, including those resulting from asymmetric spring suspension movements of the shock absorbers of the two wheels. Said block is achieved, however, by means of two blocking components (the two rods) and not by means of three blocks (blocking of the quadrilateral and of the two shock absorbers) as in the conventional solutions. In this case too, for the same performance, the block system according to the invention is mechanically simpler.

Like the traditional block systems, the complete blocking of rolling movements, including those deriving from asymmetric spring suspension movements of the wheels, determines a block of the pitch movements (symmetric spring suspension movements of the two suspensions).

Moreover, thanks to the fact that the roll block system 100 acts directly on a single axle journal 60, or possibly on both axle journals 60, and not on the rolling kinematic mechanism 20 which enables the wheels to roll synchronously and in a specular manner, the roll block system 100 according to the invention is not directly conditional to the presence of said rolling kinematic mechanism and its specific mechanical configuration, but may only be influenced indirectly to the extent that such rolling kinematic mechanism influences the kinematics of the axle journals in the rolling movements.

All this constitutes a further element of mechanical simplification and assembly which makes the roll block system according to the invention advantageous compared to conventional systems.

What has already been said applies regardless of the configuration of said rolling kinematic mechanism 20, which may in particular be an articulated quadrilateral or suspended arms.

As will be made clearer below, the influence of the rolling kinematic mechanism 20 on the kinematics of the axle journals in the rolling movements depends both on the configuration of said rolling kinematic mechanism and on the type of means chosen to reversibly block the extensible rod 110 on the rolling plane with respect to the axle journal 60 and to the forecarriage frame 16.

As will be resumed henceforth in the description, the reversible blocking means chosen to reversibly block the lying position of the extensible rod (or in other words to reversibly blocking the spatial orientation of the extensible rod with respect to the plane containing the axle journal and the centreline plane M-M or a plane parallel to centreline plane M-M) may, in particular, be of two types:

a first type (preferred) provides that the blocking of the lying position (or, in other words, the blocking of the spatial orientation of the extensible rod with respect to the plane containing the axle journal and the centreline plane M-M or a plane parallel to centreline plane M-M) is realized by blocking the rotation of the extensible rod 110 with respect to the axle journal 60 or to the forecarriage frame 16, leaving the rod 110 however, free to extend in length;

a second type (alternative) provides that the blocking of the lying position (or, in other words, the blocking of the spatial orientation of the extensible rod with respect to the plane containing the axle journal and to the centreline plane M-M or to a plane parallel to centreline plane M-M) is achieved by blocking the distance D between the two points of the axle journal 60 and of the forecarriage frame 16 connected by the extensible rod 110, preventing the rod 110 from extending in length.

In the case in which the first type of reversible blocking means is adopted, the roll block system 100 is not influenced by the rolling kinematic mechanism 20.

Diversely, in the case in which the second type of reversible blocking means is adopted, the roll block system 100 may be influenced by the rolling kinematic mechanism 20, as will be clarified henceforth in the description.

Preferably, as mentioned above, the means for reversibly blocking the lying position of said extensible rod 110 with respect to the axle journal 60 and/or with respect to the forecarriage frame 16 (or, in other words, the means 120, 130 for reversibly blocking the spatial orientation of said length extensible rod 110 with respect to the plane containing the axle journal 60 and to the centreline plane M-M or to a plane parallel to centreline plane M-M) are suitable to block the rotation of the extensible rod 110 with respect to the axle journal 60 or to the forecarriage frame 16, leaving the rod 110 however free to extend in length.

In particular, the aforesaid reversible blocking means 120 can block the rotation of the rod 110 in correspondence of at least one of the ends with which said extensible rod 110 is connected to the axle journal 60 or to the forecarriage frame 16, acting directly or indirectly on the hinging means.

According to the embodiments illustrated in FIGS. 1 to 5, the reversible blocking means 120 are configured to act directly on the hinging means, blocking at least in part the rotation thereof.

More in detail, in this case, the hinging means, which the reversible blocking means are configured to act on, consist of a pair of cylindrical hinges 72 and 73 with axes orthogonal to each other. A first hinge 72 of said pair has its own hinging axis orthogonal to the rolling plane of the two front wheels 10', 10", in such a way that the extensible rod 110 can move parallel to the rolling plane when the reversible blocking means 120 are not activated.

Operatively, the reversible blocking means 120 are suitable to block the rotation of the extensible rod 110 around the aforesaid first hinge 72 so as to prevent the rod 110 from rotating with respect to the axle journal 60 or forecarriage frame 16 on the rolling plane.

According to an embodiment not illustrated in the appended figures, the blocking of the rotation of the extensible rod can be realized at both ends of the rod 110, i.e. both with respect to the axle journal and with respect to the forecarriage frame. Such a double block is redundant and is only functional to obtain a more secure blocking of the extensible rod.

As shown in FIGS. 1 to 5, the reversible blocking means comprise a band brake 120 associated to the first cylindrical hinge 72 of the pair of hinges with orthogonal axes to reversibly block the rotation of the rod 110.

More specifically, as shown both in FIG. 4 and in FIG. 5, the rod 110 is connected at one end to an axle journal 60 with a spherical joint 71 and at the other end to the forecarriage frame 16 by a pair of hinges 72, 73 with orthogonal axes, of which a first hinge 72 with a hinge axis perpendicular to the rolling plane. The rod extensible in length 110 is formed of two portions 111, 112 telescopically associated to one another according to a main direction of longitudinal extension. The band brake 120 is placed at the first cylindrical hinge 72. The brake 120 comprises:—a support body 121, which is integral with the forecarriage frame 16; and—a drum 122, which is rotationally associated with the support body 121 to rotate around the axis defined by the first hinge 72 and is associated to the first telescopic portion 112 of the rod 110 by means of the second hinge 73. The drum 122 is partially inserted inside the support body 121 and forms with it an annular interspace inside which a band is housed (not visible in the drawing). The two ends of the band are fixed to an actuation lever 123 of the brake band in different positions. By actuating the lever 123, the band is tightened around the drum 122 and prevents its rotation about the hinge axis. This way the rotation of the extensible rod 110 around the first hinge 72 and thus with respect to the forecarriage frame 16 is prevented. Operatively, this leads to the blocking of the angle α between the rod 110 and the forecarriage frame 16 and thus to the blocking of the lying position of the extensible rod 110. When the lever 123 is not activated, the band is not tightened around the drum 122 and the rod 110 and is free to rotate about the axis of the first hinge 72 freeing the rolling movements allowed by the articulated quadrilateral (rolling kinematic mechanism 20).

Alternatively to the band brake 120, it is possible to use a drum brake.

According to alternative embodiments, not illustrated in the appended drawings, the reversible blocking means may be configured to act indirectly on the hinging means, blocking at least in part the rotation thereof.

In particular, the aforesaid reversible blocking means may comprise a strut extensible in length, which is provided with blocking means of its length and connects diagonally the extensible rod 110 to the axle journal 60 or to the forecarriage frame 16. The strut connects both to the rod 110 and to the axle journal 60 or to the forecarriage frame 16 by means of hinging means such that, when the strut is left free to extend in length, it is configured not to hinder the movement of the extensible rod with respect to the axle journal and to the forecarriage frame, while when it is blocked in length said strut is configured to prevent the rotation of the rod with respect to the axle journal and to the forecarriage frame in the common lying plane of the rod and axle journal or rod and frame.

Advantageously, said extensible strut is positioned so that, even when blocked, it is suitable to leave the extensible rod 110 free to extend in length.

As already mentioned earlier, in the case in which the first type of reversible blocking means is adopted, i.e. with blocking of the rotation of the rod, but with freedom for the rod to extend in length, the roll block system 100 is not influenced by the rolling kinematic mechanism 20.

In general, it follows therefore that the rod extensible in length 110 can connect any two points on the axle journal and on the forecarriage frame without there being any particular positioning constraint.

Preferably, as provided for in the embodiments illustrated in particular in FIGS. 4 and 5, the rod extensible in length 110 connects the axle journal 60 and the forecarriage frame 16 at the same height relative to the ground, so as to be parallel to the ground. In the case in which the rolling kinematic mechanism 20 consists of an articulated quadrilateral (as in FIGS. 3 and 4), said rod 110 is substantially parallel to the cross members 24 of the articulated quadrilateral.

The fact that the extensible rod 110 always has the possibility of extending in length, even when the reversible blocking means are activated, prevents the roll block system from influencing or blocking the steering.

Preferably, as illustrated in FIGS. 4 and 5, in order to minimize the variations in length of the extensible rod 110 during steering movements, the extensible rod 110 is connected to the axle journal 60 in a position as close as possible to the steering axis S'-S' or S"-S" of the wheel associated to the axle journal 60. In FIG. 4 the extensible rod 110 is connected to the axle journal 60 on the steering axis S'-S' of the wheel associated to the axle journal 60, while in FIG. 5 the extensible rod 110 is connected to the axle journal 60 near the steering axis S'-S' of the wheel associated to the axle journal 60.

According to alternative embodiments of the invention, not illustrated in the appended drawings, the means 130 for reversibly blocking the lying position of the extensible rod 110 with respect to the axle journal 60 and/or with respect to the forecarriage frame 16 (or in other words the means 130 for reversibly block the spatial orientation of said length extensible rod 110 with respect to the plane containing the axle journal 60 and to the centreline plane M-M or to a plane parallel to centreline plane M-M) can block the lying position (or the spatial orientation of said length extensible rod 110) by blocking the distance D between the two points of the axle journal 60 and of the forecarriage frame 16 connected by the extensible rod 110 preventing the rod 110 from extending in length.

Preferably, in the case in which the reversible blocking means 130 operate by blocking the extensibility of the rod 110, the connection point of the rod 110 on the axle journal 60 is chosen so that it lies on the steering axis S'-S', S"-S" of the respective axle journal 60. This way, when the reversible blocking means are activated, i.e. with the length of the rod blocked, the steering movements are not hindered.

As already mentioned earlier, in the case in which the second type of reversible blocking means is adopted, i.e. with blocking of the length of the rod, the roll block system 100 may be influenced by the rolling kinematic mechanism 20.

In the particular case in which the rolling kinematic mechanism 20 is a system with two suspended arms, the roll block system 100 is not influenced by the rolling kinematic mechanism 20.

Advantageously, in this case the extensible rod 110 may be connected on the axle journal 60 on any portion of said axle journal, which is located on the steering axis S'-S', S"-S" of the respective axle journal 60, and may be connected to the forecarriage frame 16 on any portion thereof. In fact, during the rolling movements the distance between the axle journals and, in particular, the distance D between each axle journal and the forecarriage frame always varies, regardless of the points in which said distance is measured. As a result, the extensible rod 110 of the roll block system placed in connection between an axle journal and the forecarriage frame will always be effective for blocking the rolling movements. The positioning on the steering axis is functional to not affect the steering.

In the particular case in which the rolling kinematic mechanism 20 is an articulated quadrilateral, the roll block system 100 is instead influenced by the rolling kinematic mechanism 20.

In fact, during the rolling movements the distance between the axle journals and, in particular, the distance D between each axle journal and the forecarriage frame effectively varies only between some portions of the axle journals. In this case, the extensible rod 110 of the roll block system 100 cannot connect the axle journal and the forecarriage frame between any two points, but specific points of connection between the axle journals must be identified.

More in detail, with reference to FIGS. 6a and 6b, the discriminating condition in this respect is:

the position adopted by the connection point on the axle journal 60 with respect to the ideal lying plane Y-Y of the upright 48', 48" of the articulated quadrilateral to which the axle journal is associated; and the position adopted by the connection point on the forecarriage frame 16 with respect to the ideal lying plane Z-Z passing through the axes of the two lateral hinges 52 of the articulated quadrilateral.

The term "ideal lying plane Y-Y of the upright" is taken to mean the plane passing through the hinging axes of the upright 48', 48" on the two cross members 24', 24" of the articulated quadrilateral.

In the case in which the connection point of the rod 110 on the axle journal 60 lies on the ideal lying plane of the upright Y-Y, to which the axle journal is associated, and also the connection point of the rod 110 on the forecarriage frame 16 lies on the lying plane passing through the two middle hinges 28, the two connection points of the rod 110 must be mutually aligned according to a direction not parallel to the two cross members of the articulated quadrilateral. In other words, the rod 110 of the roll block system must be able to block the distance D between two points along a straight line not parallel to the cross members of the articulated quadrilateral. In the case of rolling and thus in the case of changing the configuration of the parallelogram, such distance D will vary and the roll block system will be effective in blocking the distance between the axle journal and the forecarriage frame.

In the case in which the connection point of the rod 110 on the axle journal does not lie on the ideal lying plane Y-Y of the upright to which the axle journal is associated, or the connection point of the rod 110 on the forecarriage frame 16 does not lie on the lying plane Z-Z passing through the two middle hinges 28, the two connection points of the rod 110 may be mutually aligned according to any direction with respect to the two cross members of the articulated quadrilateral. This choice may also be made in the case in which both of the above conditions occur simultaneously. In the case of rolling and thus in the case of changing the configuration of the articulated parallelogram, the distance D between the above two points will vary in any case and the roll block system will therefore be effective in blocking said distance.

Preferably, said two connection points are chosen so that they are aligned with each other in a direction parallel to the two cross-members of the articulated quadrilateral.

FIGS. 6a and 6b illustrate the case in which the connection point of the rod 110 on the axle journal lies on the ideal lying plane Y-Y of the upright to which the axle journal is associated, while the connection point of the rod 110 on the forecarriage frame 16 does not lie on the lying plane Z-Z passing through the two middle hinges 28, but is spaced from it by a distance A. The rod 110 is arranged parallel to the two cross members 24', 24" of the articulated quadrilateral.

According to a particular embodiment shown schematically in FIGS. 6a and 6b, the aforesaid means 130 for reversibly blocking the lying position of the extensible rod 110 with respect to the axle journal 60 and/or with respect to the forecarriage frame 16 (or in other words the means 130 for reversibly block the spatial orientation of said length extensible rod 110 with respect to the plane containing the axle journal 60 and to the centreline plane M-M or to a plane parallel to centreline plane M-M) operate by blocking the mutual telescopic sliding of the two portions 111, 112 of the extensible rod 110 and thus the length of the rod 110. Said means 130 are thus suitable to block the telescopic sliding of the two portions of the rod 110.

In particular, said reversible blocking means consist of a caliper-brake system 130 acting on the two telescopic portions 111 and 112 of the rod 110.

More in detail, the caliper body is fixed to a portion of the rod and is equipped with two friction elements, opposite each other and shaped according to the shape of the second telescopic portion of the rod. The brake-caliper can be controlled in any way, preferably hydraulically operated, but can also be activated mechanically via wire. Said brake-caliper allows a continuous blocking of the rod at any extension value in length and thus allows the blocking of the vehicle with any rolling angle.

Alternatively to the brake-caliper system 130, the blocking means of the length of the rod may consist of a ratchet system. More in detail, said ratchet system comprises a sprocket made on the telescopic portion of the rod with a smaller cross-section and a movable ratchet, pivoted on the other telescopic portion of greater cross-section, operable to engage or disengage the sprocket.

Unlike the brake-caliper system, such a system does not allow however, a continuous blocking of the rod at any value of extension in length, but only at discrete blocking values. The vehicle may thus be blocked only at predefined rolling angles.

Preferably, the aforesaid roll block system 100 further comprises an automatic control device (not shown) of the aforementioned reversible blocking means. Such automatic control device comprises an electronic control unit which actuates the reversible blocking means following a predefined control logic, in particular aimed at blocking the rolling movements with the vehicle stationary or moving at low speeds, ensuring the stability of the motor vehicle and the safety of users.

Alternatively or in parallel to the automatic operation, the aforesaid roll block system 100 may comprise a manual actuation system of the reversible blocking means controlled directly by the driver of the motor vehicle.

Preferably, the manual commands set by the driver are filtered by an electronic control panel according to a main operating logic of the motor vehicle aimed at ensuring the safety thereof.

The present invention relates to a motor vehicle 4 having at least one drive wheel on the rear and a forecarriage 8 according to the present invention, and in particular as described above.

In the case in which the motor vehicle is a quadricycle, the rear drive wheels 14 at the rear axle 12 are connected to each other and to a rear axle frame 13 by means of a rolling kinematic mechanism 20 as described above in relation to the front wheels 10.

The invention permits numerous advantages to be achieved, in part already described.

The forecarriage of the rolling motor vehicle according to the invention is equipped with a roll block system which in its general embodiment (a single rod connecting an axle journal and the forecarriage frame) allows blocking of the rolling movements not due to asymmetric spring suspension movements in a mechanically simpler manner compared to conventional solutions. Such block is in fact realized by means of a single blocking component, rather than two.

The forecarriage of the rolling motor vehicle according to the invention is equipped with a roll block system which in its particular embodiment (two rods connecting both axle journals to the forecarriage frame) allows blocking of all the rolling movements, including those related to asymmetric spring suspension movements in a mechanically simpler manner compared to conventional solutions. Such block is in fact realized by means of two blocking components, rather than three.

Moreover, the forecarriage of a rolling motor vehicle according to the invention is equipped with a roll block system, which is constructively simple and inexpensive to produce and to fit on said motor vehicle. It may, in fact, consist of a telescopic rod extensible in length with relative blocking device of the length or of the rotation (for example, band brake).

The roll block system according to the invention can be realized in such a way that, when activated, it does not inhibit the steering of the motor vehicle.

The roll block system according to the invention is also independent of the kinematic mechanism which enables the wheels to roll synchronously and in a specular manner.

The invention thus conceived thereby achieves the intended objectives.

Obviously, its practical embodiments may assume forms and configurations different from those described while remaining within the scope of protection of the invention.

Moreover, all the details may be replaced by technically equivalent elements and the dimensions, forms and materials used may be any as needed.

The invention claimed is:

1. A forecarriage of a rolling motor vehicle with three or four wheels, comprising:
   a forecarriage frame,
   at least one pair of front wheels kinematically connected one to each other and to the forecarriage frame by means of a kinematic rolling mechanism which enables the front wheels to roll in a synchronous and specular manner, each wheel being connected to said kinematic rolling mechanism by means of a respective axle journal, said axle journal being mechanically connected to a rotation pin of a respective wheel in order to rotatably support said respective wheel around an rotation axis,
   a roll block system,
   suspension means which provide each axle journal at least one spring suspension movement with respect to said kinematic rolling mechanism,
   a steering device suitable to command the rotation of the axle journals about respective steering axes of each front wheel,
   wherein said roll block system comprises a length extensible rod which directly connects one of said two front wheels in correspondence of the respective axle journal to said forecarriage frame by means of hinging means at both ends of said length extensible rod, said forecarriage frame being suitable to follow the axle journal in rolling movements which are allowed by said kinematic rolling mechanism, said length extensible rod being suitable to passively follow the movements of said axle journal and of said forecarriage frame by varying its orientation in space with respect to them, and
   wherein said roll block system comprises reversible blocking means which is suitable to reversibly block the lying position of said extensible rod on a rolling plane, with respect to said axle journal and/or with respect to said forecarriage frame, so as to be suitable to block the rolling movements allowed by said kinematic rolling mechanism, said lying position being defined by the angle formed by the projection of the rod on a vertical projection plane with a reference plane orthogonal to the rotation axis of the wheel associated to said axle journal, wherein said vertical projection plane is transverse to a centreline plane.

2. The forecarriage according to claim 1, wherein the hinging means are constituted by ball joints or devices kinematically equivalent to ball joints.

3. The forecarriage according to claim 2, wherein said devices kinematically equivalent to ball joints are constituted by a pair of cylindrical hinges with axes orthogonal to each other.

4. The forecarriage according to claim 1, wherein said rod extensible in length is formed by at least two portions telescopically associated with one another according to a direction of prevailing longitudinal extension.

5. The forecarriage according to claim 1, wherein said reversible blocking means are suitable to block the rotation of the extensible rod with respect to said axle journal or to said forecarriage frame, leaving the rod free to extend in length.

6. The forecarriage according to claim 5, wherein said reversible blocking means are suitable to block the rotation of the rod in correspondence of at least one of the ends with which said extensible rod is connected to said axle journal or to said forecarriage frame, acting directly or indirectly on the hinging means.

7. The forecarriage according to claim 6, wherein said reversible blocking means are configured to act directly on the hinging means blocking their rotation, at least partly, and wherein the hinging means on which the reversible blocking means act are constituted by a pair of cylindrical hinges having axes orthogonal to each other, one first hinge of the two hinges of said pair having its hinge axis orthogonal to the rolling plane of the two front wheels, in such a way that the extensible rod can move parallel to said rolling plane when said means are not activated, said reversible blocking means being suitable to block the rotation of said rod around said first hinge so as to prevent the rod from rotating with respect to said axle journal or forecarriage frame on said rolling plane.

8. The forecarriage according to claim 7, wherein said reversible blocking means comprise a band brake or a drum brake associated to the first cylindrical hinge of said pair of hinges with orthogonal axes to reversibly block the rotation of the rod with respect to said at least one end.

9. The forecarriage according to claim 6, wherein said reversible blocking means are configured to act indirectly on the hinging means blocking their rotation, at least partly, and wherein said reversible blocking means comprise a strut extensible in length, which is provided with means of blocking its length and diagonally connects said extensible rod to the axle journal or to the forecarriage frame, said strut connecting both to the rod and to the axle journal or to the forecarriage frame by means of hinging means such that, when the strut is left free to extend in length, said extensible strut is configured not to hinder the movement of the extensible rod with respect to the axle journal and to the forecarriage frame, while when it is blocked in length said extensible strut is configured to prevent the rotation of the rod with respect to the axle journal or to the frame in the common lying plane between rod and axle journal or between rod and frame, said extensible strut being placed in such a way that, even when blocked, it is suitable to leave said rod free to extend in length.

10. The forecarriage according to claim 1, wherein said reversible blocking means are suitable to block said lying position by blocking the distance between the two points of said axle journal and of said forecarriage frame connected from said extensible rod preventing said rod from extending in length.

11. The forecarriage according to claim 10, wherein the connection point of the rod on the axle journal is located on the steering axis of the respective axle journal.

12. The forecarriage according to claim 10, wherein said kinematic rolling mechanism is a system with two suspended arms.

13. The forecarriage according to claim 12, wherein the extensible rod is connected on the axle journal on any portion of the axle journal, which is located on the steering axis of the respective axle journal and is connected to the forecarriage frame on any portion of the latter.

14. The forecarriage according to claim 10, in which said kinematic rolling mechanism is an articulated quadrilateral system, which comprises a pair of cross members, hinged to said forecarriage frame in correspondence of middle hinges, said cross members being connected one to each other, in correspondence of opposite transverse ends, by means of uprights pivoted to said transverse ends in correspondence of side hinges, the cross members and the uprights defining said articulated quadrilateral system, each of the uprights guiding and supporting an axle journal of one of said front wheels.

15. The forecarriage according to claim 14, wherein the connection point of the rod on the axle journal lies on the ideal lying plane of the upright to which is associated the axle journal, said ideal lying plane passing through the axes of the two side hinges, while the connection point of the rod on the forecarriage frame lies on the lying plane passing through the two middle hinges, the two connection points of the rod being mutually aligned according to a direction not parallel to the two cross members of the articulated quadrilateral system.

16. The forecarriage according to claim 14, wherein the connection point of the rod on the axle journal does not lie on the ideal lying plane of the upright to which is associated the axle journal, said ideal lying plane passing through the axes of the two side hinges, or the connection point of the rod on the forecarriage frame does not lie on the lying plane passing through the two middle hinges, the two connection points of the rod being mutually aligned according to any direction with respect to the two cross members of the articulated quadrilateral.

17. The forecarriage according to claim 10, wherein said rod extensible in length is formed by at least two portions telescopically associated with one another according to a direction of prevailing longitudinal extension; and wherein said reversible blocking means are suitable to block the mutual telescopic sliding of the two portions of the extensible rod and thus the length of the rod.

18. The forecarriage according to claim 17, wherein said reversible blocking means are constituted by a caliper-brake system acting on the two telescopic portions of the rod.

19. The forecarriage according to claim 17, wherein said reversible blocking means are constituted by a ratchet gear system acting on the two telescopic portions of the rod.

20. A motor vehicle having a drive wheel at the rear and a forecarriage according to claim 1.

21. The forecarriage according to claim 3, wherein said pair of cylindrical hinges comprises one first hinge of the two hinges of each pair having a hinge axis orthogonal to the rolling plane of the two front wheels.

22. The forecarriage according to claim 4, wherein said two rod portions are associated to each other with a cylindrical coupling to allow free relative rotation around said direction of prevailing longitudinal extension.

23. The forecarriage according to claim 16, wherein said two connection points are mutually aligned according to a direction parallel to the two cross members of the articulated quadrilateral system.

24. The forecarriage according to claim 17, wherein said two rod portions are associated to each other with a cylindrical coupling to allow free relative rotation around said direction of prevailing longitudinal extension.

* * * * *